United States Patent [19]
Hoshino et al.

[11] Patent Number: 4,530,018
[45] Date of Patent: Jul. 16, 1985

[54] INFORMATION RECORDING/REPRODUCING APPARATUS WITH DISK HAVING SECTIONS OF DIFFERENT ANGULAR VELOCITY

[75] Inventors: Isao Hoshino; Teruo Murakami, both of Yokohama, Japan

[73] Assignee: Tokyo Shibaura Denki Kabushiki Kaisha, Kawasaki, Japan

[21] Appl. No.: 421,732

[22] Filed: Sep. 23, 1982

[30] Foreign Application Priority Data

Nov. 20, 1981 [JP] Japan ................. 56-185260

[51] Int. Cl.³ .................. G11B 19/24; G11B 21/08; G11B 19/26
[52] U.S. Cl. .................. 360/73; 360/72.1; 360/72.2; 360/78
[58] Field of Search ............ 360/73, 72.2, 72.1, 360/74.1, 74.4, 78; 369/47, 50, 59, 93, 95, 32

[56] References Cited
U.S. PATENT DOCUMENTS 4,390,912  6/1983  Hertrich et al. .............. 360/78

FOREIGN PATENT DOCUMENTS 0013903  3/1980  European Pat. Off. .
0011493  5/1980  European Pat. Off. .
0023845  2/1981  European Pat. Off. .
3030720  3/1982  Fed. Rep. of Germany .
56-61064  5/1981  Japan .
2015204  9/1979  United Kingdom .............. 360/78
2062905  5/1981  United Kingdom .

OTHER PUBLICATIONS

"RCA Develops Laser-Storage Method That Could Reach 10¹¹ Bits per Disk": Laser Focus, Mar. '79, pp. 28-30.
IBM Technical Disclosure Bulletin, vol. 23, No. 11, Apr. 1981, pp. 5068-5069, N.Y., R. F. Herald et al., "Zone Recording Flexible Diskette Drive Via Microprocessor Control".
Patent Abstracts of Japan, vol. 2, No. 104, Aug. 26, 1978, p. 5392 E 78.
Patent Abstracts of Japan, vol. 5, No. 73 (P-61)[745], May 15, 1981.

Primary Examiner—Raymond F. Cardillo, Jr.
Assistant Examiner—Alan K. Aldous
Attorney, Agent, or Firm—Oblon, Fisher, Spivak, McClelland & Maier

[57] ABSTRACT

In a data recording/reproducing apparatus, a DC motor is provided for rotating an optical disk. A recording/reproducing head is driven to move over the disk linearly in the radial direction of the disk, thereby defining a plurality of data-storing tracks on the disk. A motor control section is provided for controlling the rotation of the disk so as to change the angular velocity of the disk when the head tracing is changed among the track groups. While the head is tracing the tracks included in the same track group, the rotation of the disk is made constant so that the disk rotates at a constant angular speed.

8 Claims, 5 Drawing Figures

INFORMATION RECORDING/REPRODUCING APPARATUS WITH DISK HAVING SECTIONS OF DIFFERENT ANGULAR VELOCITY

BACKGROUND OF THE INVENTION

This invention relates to an apparatus for recording and reproducing information using a disk-shaped recording medium.

Recently, the importance of information recording/reproducing apparatus for recording and reproducing various information using a disk-shaped recording medium, such as a magnetic disk or an optical-disk, is increasing. This is attributable to the fact that the disk-shaped recording medium permits high density recording of data and access to recorded data at a comparatively high speed.

With the prior art information recording/reproducing apparatus using a magnetic disk or an optical-disk, the recording or reproduction of information is made on the basis of constant angular velocity (CAV) technique. The disk for storing desired information is rotated at a constant angular velocity for writing and reading information.

Commonly, a plurality of concentric circular tracks are formed on the surface of the recording disk, and each circular track is divided into a plurality of sections (which are called "sectors"). The information is written, i.e., stored, in the disk in successive sectors of tracks. It is also read out, i.e., reproduced, from successive sectors of tracks.

In the prior art information recording/reproducing apparatus, which adopts the CAV system, the angular velocity of the recording disk is fixed irrespective of the head's tracking position in the radial direction of the disk, i.e., irrespective of whether the head is tracing a track near the edge of the disk or a track near the center thereof. This means that the sectors in the individual circular tracks are aligned in the radial direction of the disk. More particularly, the start and end points of the sectors in the individual tracks are substantially aligned along lines radially extending from the center of rotation of the disk. Thus, in playback, the start point of a desired sector among a number of sectors can be relatively easily detected or retrieved since the start points of sectors are aligned along radial lines as described above.

In the prior art information recording/reproducing apparatus based on the CAV system, however, the quality of information stored in an outer track region near the edge portion of the disk is inferior compared to the quality of information stored in an inner track region near the center of the disk. That is, uniform high quality recording and reproduction of information cannot be obtained. In addition, longer arcuated sectors are required in the outer track region, and shorter arcuated sectors in the inner track region, for storing information consisting of the same number of bits. This means that the information recording density is lower the closer the track is to the edge of the disk. That is, uniform high density recording of information on the disk cannot be essentially obtained.

To overcome the drawbacks discussed above which are inherent in the prior art apparatus based on the CAV system, there has been developed an information recording/reproducing apparatus in which the recording disk is rotated on the basis of a constant linear velocity (CLV) technique. In such apparatus, the rotational disk speed, i.e., the angular velocity of disk, is continuously varied to provide a constant relative speed of the head and disk. In this case, the length of each sector is fixed irrespective of its position in the radial direction of the disk. Thus, it is possible to obtain recording and reproduction of information with uniformly high quality and uniformly high density over the entire disk surface. To date, various information recording/reproducing apparatuses adopting such system have been developed for the recording and reproduction of continuous data information such as video or audio signal.

However, where information is stored in successive sectors on the recording disk in the CLV system apparatus, the start and end points of sectors on the individual tracks are not aligned in radial directions of the disk. Therefore, an undesirably long time is required for retrieving a desired sector in playback.

Neither the prior art information recording/reproducing apparatus based on the CAV system nor the prior art information recording/reproducing apparatus based on the CLV system is capable of simultaneously storing data in successive sectors on the disk with uniformly high quality and density and retrieving a sector in which desired data is stored.

SUMMARY OF THE INVENTION

An object of the invention is to provide a new and improved information recording/reproducing apparatus in which information can be stored with a high density, and also in which desired information can be retrieved at high speed.

The information recording/reproducing apparatus according to the present invention comprises an information storing disk, a motor for driving the disk, and a head section, which can be moved in radial directions along the rotating disk to form a plurality of tracks in which data is stored in successive sectors and reproduce data stored in at least one of the sectors in a desired track. The motor is controlled by a motor control section. The motor control section, connected to the motor, controls the rotation of the motor such that, when the tracks formed on the disk are divided into a plurality of groups each consisting of a given number of adjacent tracks, the angular speed of the disk is substantially made constant while the head section is tracing the tracks of a single group, and the angular speed is changed when the head section is allowed to trace the tracks of the adjacent group of tracks such that the average linear speed of the disk relative to the head section during tracing of the tracks of the latter group is substantially made equal to that during tracing of the tracks of the former group. The plurality of track groups each consisting of a plurality of tracks forms a track pattern on the disk such that each of the tracks includes a plurality of radially arranged sectors. Sectors in tracks of one track group have the average sector length substantially equal to the average sector length of sectors in tracks of an adjacent track group.

BRIEF DESCRIPTION OF THE DRAWINGS

The present invention is best understood by reference to the accompanying drawings, in which.

DETAILED DESCRIPTION OF THE PREFERRED EMBODIMENT

Figure 1:
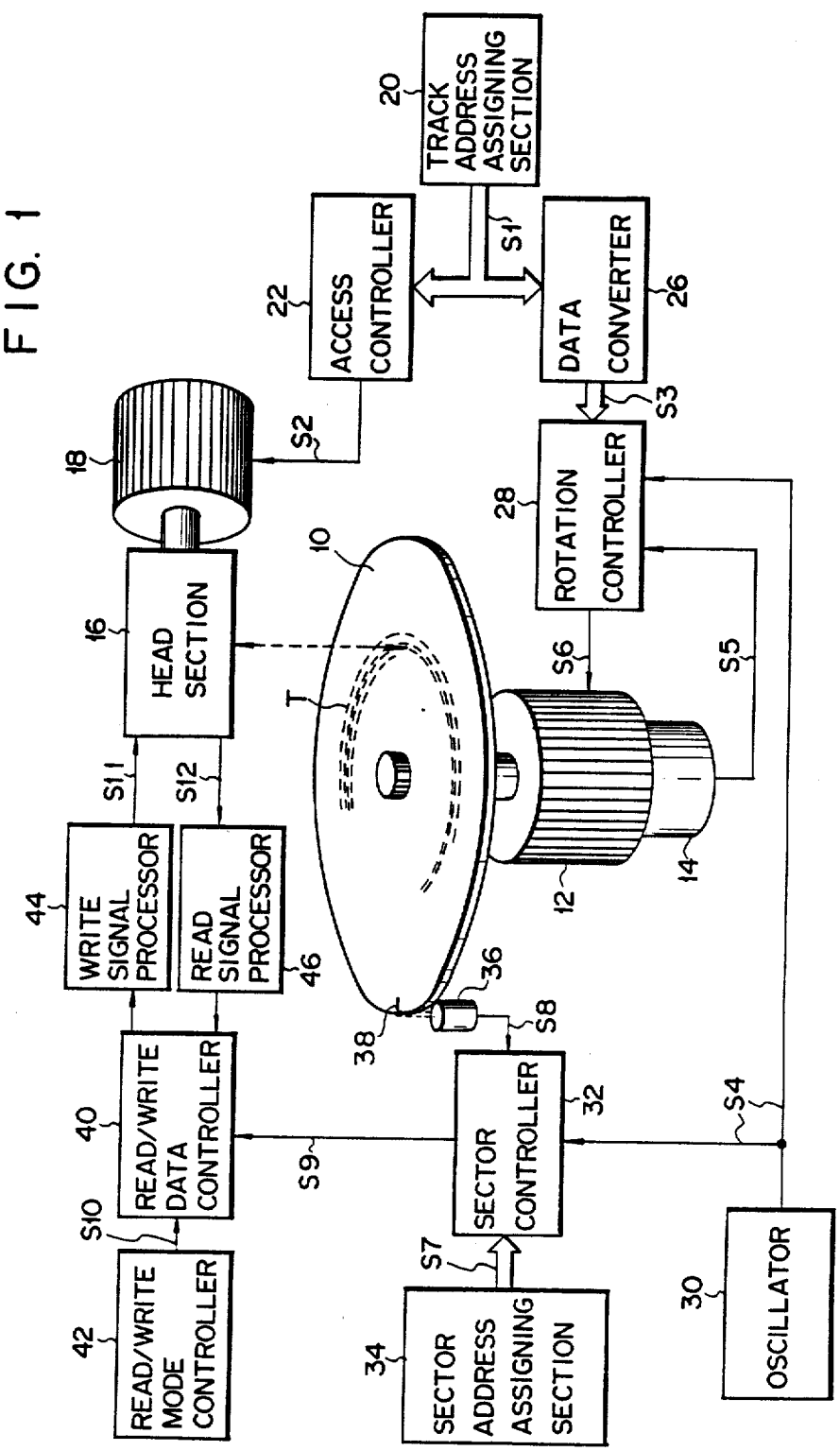
FIG. 1 is a block diagram schematically illustrating an embodiment of the invention applied to an optical type information recording/reproducing apparatus.

Referring now to FIG. 1, there is illustrated an information recording/reproducing apparatus embodying the invention using an optical-disk as recording medium.

The optical-disk 10 is driven by a DC motor 12. A rotary encoder 14 which detects the number of rotations, per unit of time, of the motor 12, is coupled to the rotating shaft of the DC motor 12. A recording/reproducing head section 16 is provided above the disk 10 such that it can be moved by a linear motor 18 in radial directions of the disk 10. The head section 16 may be of a construction well known to a person skilled in the art. A track address assigning section 20 is connected to the linear motor 18 through an access control section (access controller) 22. The linear motor 18 moves the head section 16 linearly in the radial directions of the disk 10 according to an access control signal S2 provided from the access controller 22, which is operated in response to a track number (track position) assigning signal S1 supplied from the track address assigning section 20. The head section 16 is thus moved to a position over the surface of the optical-disk 10 and corresponding to the position of the track of the track number assigned by the track address assigning section 20.

The track address assigning section 20 is also connected to a data converter 26, which is in turn coupled to the motor rotation control section (rotation controller) 28. The disk drive DC motor 12 and rotary encoder 14 are coupled to the rotation controller 28. The track number assigning signal S1 produced by the track address assigning section 20 is also supplied to the data converter 26. The data converter 26 converts the track number assigning signal S1 through a predetermined data conversion system (to be described later in detail) to produce a signal S3, which univocally corresponds to the signal S1 and regulates the motor control operation of the rotation controller 28. The signal S3, more particularly, represents the number of sectors in at least one track formed on the optical-disk 10 assigned by the track number assigning signal S1 provided by the track address assigning section 20. In other words, the data converter 26 produces a sector number assigning signal S3, which represents the number of sectors in the track represented by the track number assigning signal S1, in response to the signal S1. The signal S3 is supplied to the rotation controller 28. The rotation controller 28 further receives a reference oscillation signal S4 produced from an oscillator 30 and frequency-divides the signal S4. The rotation controller 28 further receives a rotation signal S5 produced from the rotary encoder 14 coupled to the DC motor 12 and phase-compares the signals S4 and S5. As a result of the comparison, the rotation controller 28 produces a rotation control signal S6. According to the rotation control signal S6, the rotation of the disk drive DC motor 12 is controlled to reduce the phase difference between the reference oscillation signal S4 and the rotation signal S5 to zero. The DC motor 12 is thus driven accurately at the rotational speed represented by the reference oscillation signal S4 generated by the oscillator 30.

The reference oscillation signal S4 is also supplied to a sector control section (sector controller) 32. A sector address assigning section 34 and an optical detector 36 are connected to the sector controller 32. The sector address assigning section 34 produces a sector address assigning signal S7, by which a given sector is assigned. The sector controller 32 receives the sector address assigning signal S7 and also receives a detection signal S8 generated by the detector 36. The detection signal S8 is generated each time the detector 36 optically detects a reference position mark or rotary synchronizing mark 38 which is formed at a predetermined point on the edge portion of the optical-disk 10. According to the signals S4, S7 and S8, the sector controller 32 produces a control signal S9, according to which the operation of a read/write data controller 40 for receiving and supplying data or information is properly controlled for each of the sectors assigned by the sector address assigning section 34. The sector controller 32 is reset to the initial state when it receives the detection signal S8 from the detector 36. That is, the detection signal S8 from the detector 36, representing the reference position of the disk, serves as a reset signal with respect to the sector controller 32.

An operation mode assigning section (read/write mode controller) 42 is provided as a preceding stage to the read/write data controller 40. The read/write mode controller 42 is operable by the operator to produce a mode signal S10 for assigning either a recording mode (write mode) or a reproducing mode (read mode). The read/write data controller 40 receives or supplies information in response to the mode signal S10. More particularly, when the write mode is selected by the mode controller 42, the data controller 40 supplies a signal to be recorded (not shown) through a write signal processing section 44 to the head section 16. The signal S11 transmitted to the head section 16 is stored in the optical-disk 10 in successive sectors of tracks. When the read mode is selected by the mode controller 42, the data controller 40 supplies a reproduction signal (read signal) S12, which has been reproduced among information stored in the optical-disk 10 by the head section 16 and read out through a read signal processing section 46, to a well-known signal reproducing system (not shown). The setting of data in the track address assigning section 20, sector address assigning section 34 and read/write mode controller 42 is done according to signals from a control section (not shown). The read/write data controller 40 is of a construction well-known to a person skilled in the art.

Figure 2:
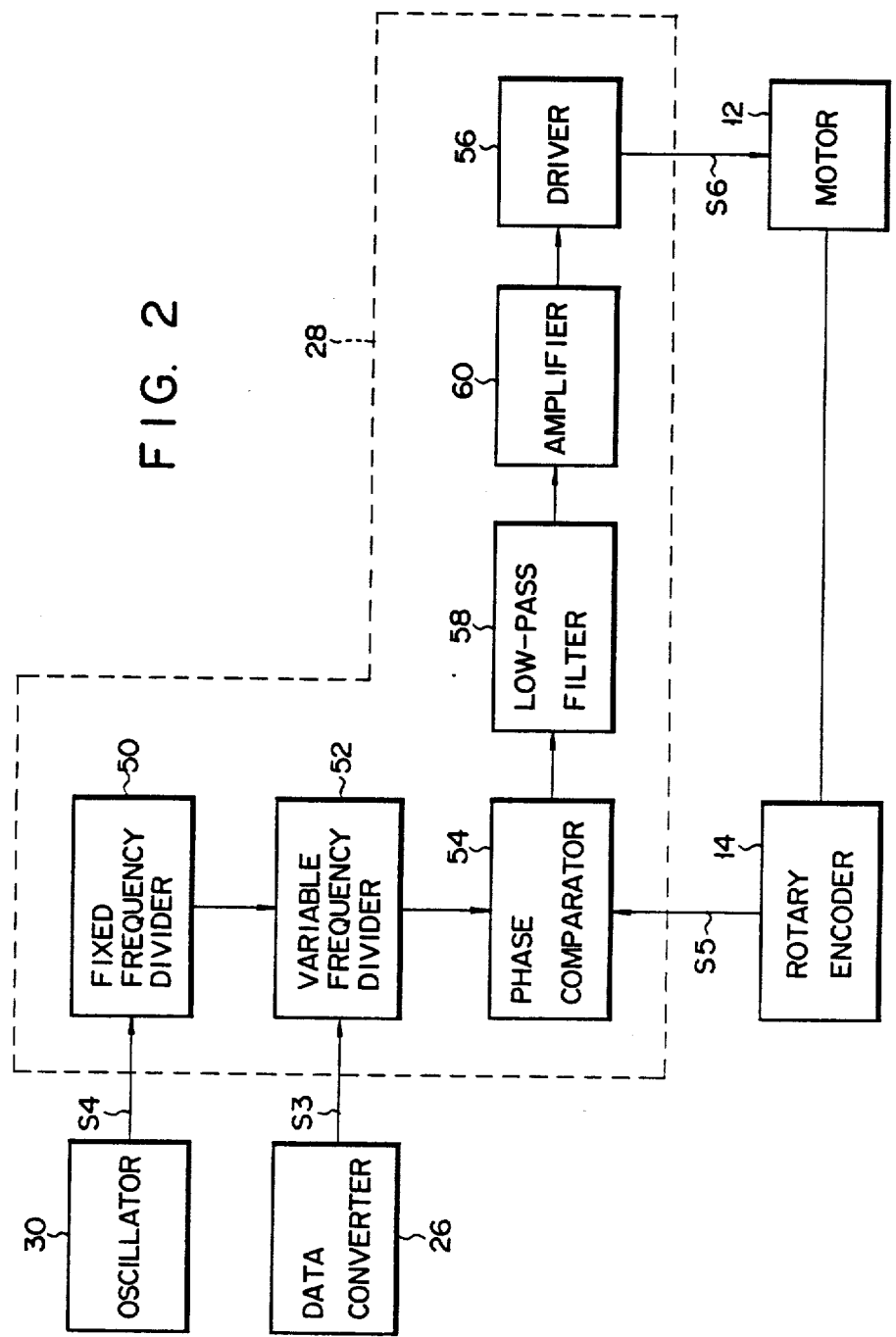
FIG. 2 is a block diagram showing a motor rotation control section in the optical type information recording/reproducing apparatus of FIG. 1 in detail.

FIG. 2 shows the internal construction of the rotation controller 28. The rotation controller 28 includes a fixed frequency divider 50 connected to the oscillator 30, and a variable frequency divider 52 connected to the data converter 26 and also to the fixed frequency divider 50. The output terminal of the variable frequency divider 52 is connected to a first input terminal of a phase comparator 54. The rotary encoder 14 is connected to a second input terminal of the phase comparator 54. The output terminal of the phase comparator 54 is connected to a low-pass filter 58, which is in turn connected to an amplifier 60 connected to a motor driver 56. The motor driver 56 is connected to the DC motor 12. The rotation controller 28 having the above construction effects CLV control of the disk drive DC motor 12.

The speed of recording information (write speed) in the optical-disk 10 is set to be the same as the oscillation frequency $f_0$ of the oscillator 30. Denoting the wavelength of one-bit information stored in the disk (i.e., time required to store data in one pit) by "dp", the constant line velocity V of the optical-disk 10 is given as follows:

$$V = f_0 \cdot dp \tag{1}$$

Representing the position of the read/write head section 16 in the radial direction of the optical-disk 10 by its distance $L_R$, the rotational speed R of the optical-disk 10 is given, from the equation (1), as follows:

$$R = \frac{V}{2\pi L_R} \tag{2}$$

Meanwhile, in the rotation controller 28 of FIG. 2, the rotational speed R of the optical-disk 10 is given as follows:

$$R = \frac{f_0}{N_0 \cdot N_R \cdot N_i} \tag{3}$$

where $N_O$ is the frequency-division factor of the fixed frequency divider 50, $N_i$ is the frequency-division factor of the variable frequency divider 52 and $N_R$ is the number of pulses of the rotation signal S5 produced from the rotary encoder 14 corresponding to one rotation of the optical-disk 10.

Basically, therefore, the frequency-division factor $N_i$ of the variable frequency divider 52 in the rotation controller 28 is given, from the equations (1) to (3), as follows:

$$N_i = \frac{L_R}{dp} \cdot \left( \frac{2\pi}{N_0 \cdot N_R} \right) \tag{4}$$

Thus, it will be seen that the rotation of the optical-disk 10 can be controlled on the basis of the CLV system by appropriately varying the variable frequency-division factor $N_i$ according to the position of the head section 16 in the radial direction of the optical-disk 10, i.e., its distance $L_R$ from the disk center. The variable frequency-division factor $N_i$ of the variable frequency divider 52 in FIG. 2 is set to an integral number. Further, the variable frequency-division factor $N_i$ is held fixed irrespective of changes in the radial head position in a predetermined distance range $\Delta L_R$. In other words, the frequency-division factor $N_i$ of the variable frequency divider 52 in the controller 28 is not varied linearly in perfect proportion to the position $L_R$ of the head section 16 in the radial direction of the disk 10. Rather, it is fixed to a specific value determined by the wavelength dp in a predetermined small radial head position range $\Delta L_R$. As soon as the head section 16 is moved radially over the optical-disk 10 beyond the small radial head position range $\Delta L_R$ mentioned above, the frequency-division factor $N_i$ of the variable frequency divider 52 is changed to a next specific value. That is, the variable frequency-division factor $N_i$ of the variable frequency divider 52 changes discretely or in a substantially staircase pattern according to changes in the radial head position.

The number of bits of information stored in one circular track having a given diameter and being formed on the optical-disk 10, which is controlled for rotation in the manner as described, is represented by $N_O \times N_R \times N_i$. The frequency-division factor $N_O$ of the fixed frequency divider 50 in the rotation controller 28 and the pulse number $N_R$ of the signal produced from the rotary encoder 14 are appropriately set such that the number of bits, constituting one of a plurality of sectors in the track mentioned above, is equal to $N_O \times N_R$. Under this condition, the variable frequency-division factor $N_i$ is essentially equal to the number of sectors in a specific one of a plurality of the concentric circular tracks formed on the optical-disk 10. This is so because when a given track number is assigned, the radial position $L_R$ of the track having the assigned track number is determined univocally or in the one-to-one correspondence manner, so that the number of sectors in this track can be immediately calculated on the basis of equation (4). A data conversion table for the calculation process based on equation (4) is stored in advance in the data converter 26. The data converter 26 thus has a function of automatically providing data representing the number of sectors in one of the tracks on the disk 10 that is represented by the track number assigning signal S1 when the signal S1 is given from the track address assigning section 20. The number of sectors at this time is basically equal to the frequency-division factor $N_i$ of the variable frequency divider 52 in the rotation controller 28.

Figure 3:
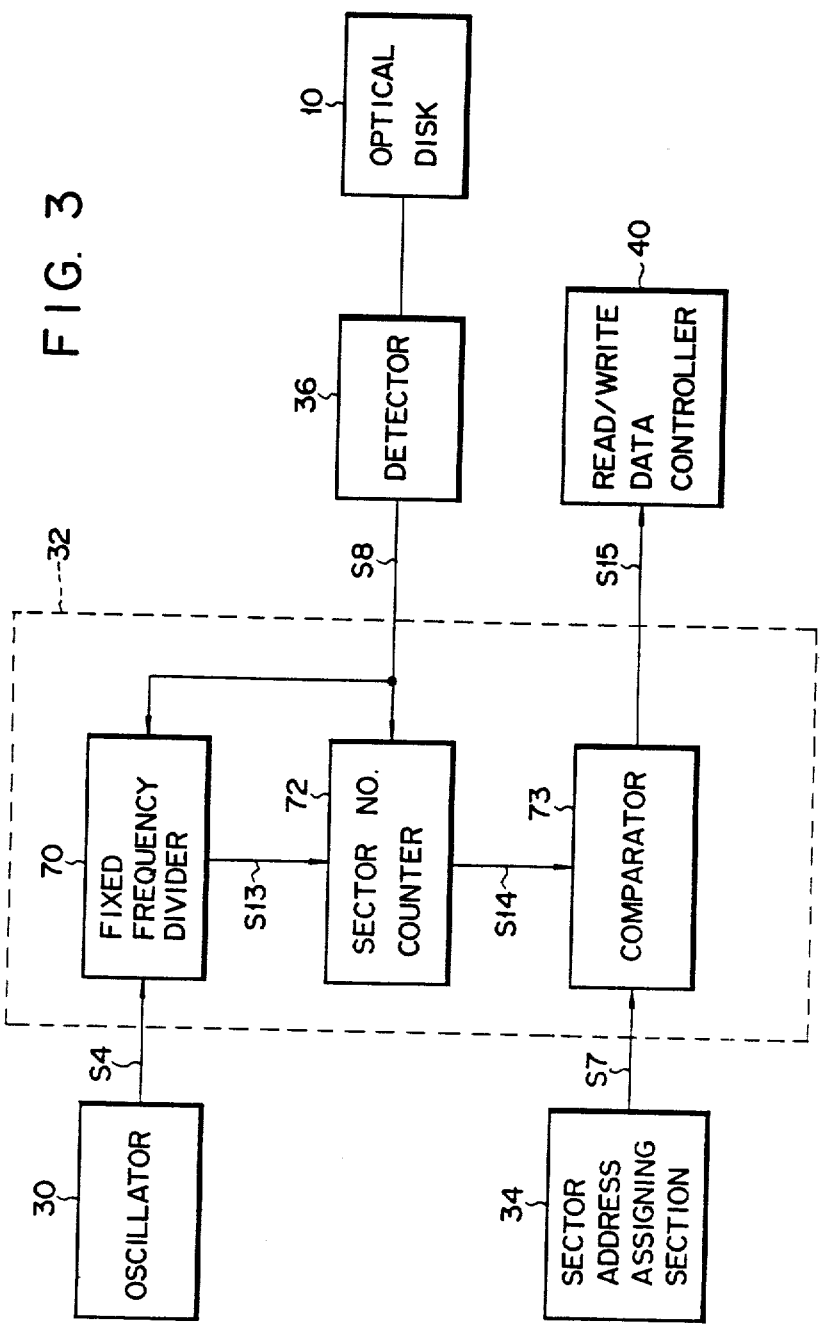
FIG. 3 is a block diagram showing a sector control section in the optical type information recording/reproducing apparatus of FIG. 1 in detail.

FIG. 3 shows the internal construction of the sector control section 32 of FIG. 1. As is shown, the sector controller 32 includes a fixed frequency divider 70 connected to the oscillator 30, a sector number counter 72 connected to the fixed frequency divider 70 and a comparator 73 connected to the counter 72 and the sector address assigning section 34. The output terminal of the comparator 73 is connected to the read/write data controller 40. The detector 36, which optically detects the rotary synchronizing mark 38 formed on the optical-disk 10 (FIG. 1 as mentioned earlier), has its output terminal connected to the fixed frequency divider 70 and sector number counter 72 in the sector controller 32.

The fixed frequency divider 70 in FIG. 3 divides the oscillation frequency $f_0$ of the oscillation signal S4 generated from the oscillator 30 by a frequency-division factor $N_O \times N_R$ equal to the number of bits constituting one sector. The sector counter 72 counts a frequency-division output signal S13 from the fixed frequency divider 70. The fixed frequency divider 70 and sector counter 72 are reset to the initial state by the one reference disk position signal S8 generated by the detector 36 (the signal S8 being generated for each rotation of the optical-disk 10). At this time, the count of the sector counter 72 is cleared. The count signal S14 from the sector number counter 72 and the sector assigning signal S7 from the sector address assigning section 34 are supplied to the comparator 73. The comparator 73 compares these signals S14 and S7 and, when these signals coincide, supplies a sector retrieval signal S15 to the read/write date controller 40.

Figure 4:
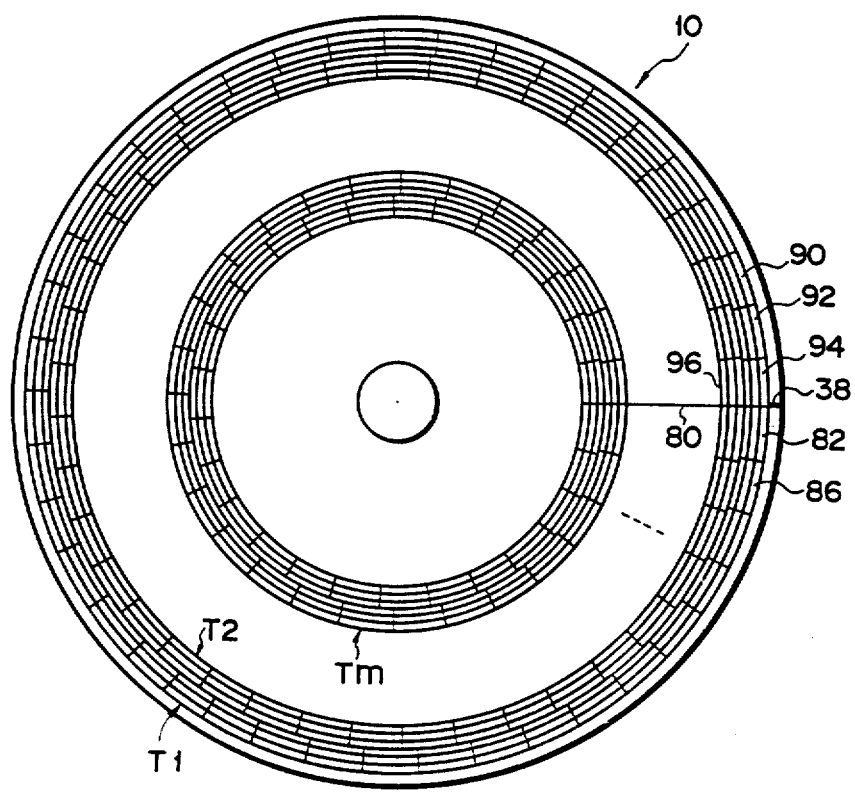
FIG. 4 is a plan view showing a track pattern formed on an optical-disk used with the optical type information recording/reproducing apparatus of FIG. 1.

FIG. 4 shows a track pattern formed on the optical-disk 10 as a result of storing or recording information such as document information in the disk 10.

In any track T formed on the optical-disk 10, irrespective of the track number, the first sector 82 is formed such that its starting point is on a line connecting the disk center and the rotary synchronizing mark 38 formed on the optical-disk 10.

Figure 5:
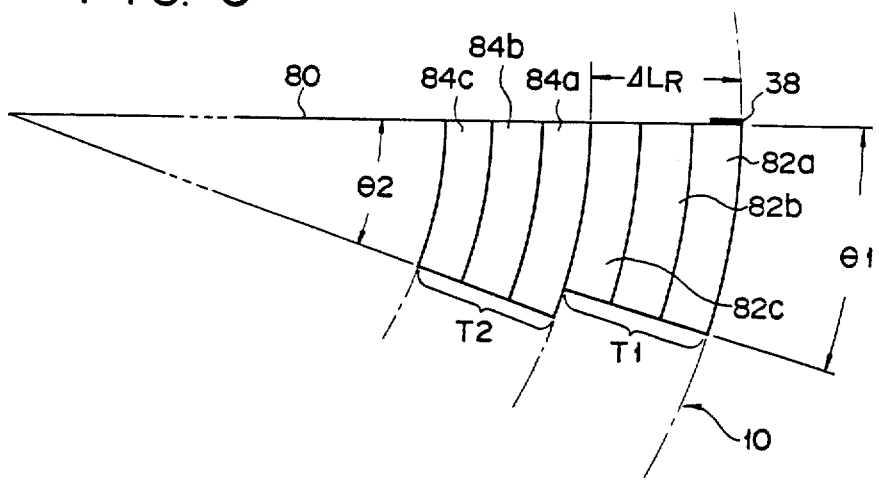
FIG. 5 is an enlarged-scale view illustrating first sectors in individual tracks formed on the optical-disk shown in FIG. 4.

When recording or writing information into the optical-disk 10, the frequency-division factor $N_i$ of the variable frequency divider 52, in the rotation controller 28, is held at a specific constant value for a predetermined radial head position range $\Delta L_R$ as mentioned earlier. In this range $\Delta L_R$, the optical-disk 10 is thus rotated at a constant angular velocity by the DC motor 12. That is, the rotation of the disk 10 is controlled on the basis of the CAV system for the aforementioned radial head position range $\Delta L_R$ for a corresponding radial disk region. Thus, the sectors in the individual tracks (for instance three tracks in this embodiment) contained in the corresponding radial disk region $\Delta L_R$ are aligned in the radial directions as shown in an enlarged-scale view of FIG. 5. As shown in the Figure, the first sectors 82a, 82b and 82c, for instance, in the respective three tracks, which constitute a first track group T1 closest to the edge of the optical-disk 10, have their end points aligned together. This is so because these sectors 82a, 82b and 82c subtend an equal angle $\theta 1$. The first sectors 84a, 84b and 84c in the respective tracks (three tracks again) included in the next track group T2 adjacent to the inner side of the first track group T1 also subtend an equal angle $\theta 2$ which is greater than the angle $\theta 1$ mentioned above in FIG. 5 the difference between angles $\theta 1$ and $\theta 2$ is shown exaggerated. Thus, these sectors 84a, 84b and 84c also have their end points aligned. The other tracks constitute similar groups, each of the same number of tracks (three tracks here). Macroscopically, the optical-disk 10 is thus controlled on the CLV basis for the individual track groups T1, T2, . . . , Tm, . . . Nevertheless, microscopically, the disk 10 is controlled on the CAV basis for the individual tracks in each track group T1, T2, . . . , Tm, . . . , that is, the sectors 82a, 82b and 82c (or 84a, 84b and 84c) in each track group are formed on the basis of the CAV system.

Turning back to FIG. 4, reference numeral 82 designates the three first sectors in the first track group T1, and reference numeral 86 designates the three second sectors in the same track group. In the first track group T1, each of three tracks consists of an integer number N of sectors successively formed on a circle, from the first sector 82 to the last or N-th sector 94. The N-th sectors 94, in the individual member tracks in the track group, have their end points aligned to the rotary synchronizing mark line 80 mentioned above.

In the second track group T2, each track contains a number of sectors equivalent to one less (i.e., N-1) than the number of sectors N in each of the tracks in the first track group T1. The three last, or (N-1)th, sectors 96 in the second track group T2 that subtend an equal angle $\theta 2$, again have their end points aligned to the rotary synchronizing mark line 80. The number of sectors in one track of the second track group T2 is thus progressively reduced by one sector in each adjacent track group closer to the center of the disk 10. That is, in the m-th track group Tm as counted from the outermost first track group T1, the number of sectors in one track is $N - m + 1$.

As has been shown, with the embodiment of the information recording/reproducing apparatus used with the optical-disk 10 as shown in FIGS. 1 to 4, the recording and reproduction of information are effected on the basis of the CLV system from the macroscopic viewpoint for the individual track groups T1, T2, . . . , Tm, . . . each consisting of a plurality of tracks, while they are effected on the basis of the CAV system from the microscopic viewpoint for the individual tracks in each track group. In other words, the optical-disk 10 is rotated at a constant angular velocity while the radial position of the head section 16 is in the range $\Delta L_R$ corresponding to the width of one track group, while when the head section 16 exceeds this range $\Delta L_R$ it is now rotated at a different constant angular velocity. In effect, the disk 10 is rotated at a line velocity which changes in a discrete fashion. Since the optical-disk 10 is driven macroscopically on the CLV basis if each track group is regarded as each track, all the sectors in the entire track area of the optical-disk surface have an approximately equal length. The sectors in tracks in one track group has the average sector length substantially equal to the average sector length of sectors in tracks in an adjacent track group. Thus, it is possible to increase the sector density and hence the information storage in a substantially uniform manner so as to increase the storage capacity of the disk 10. From the microscopic viewpoint, i.e., for a comparatively small radial position range of the head section 16 corresponding to each of the track groups T1, T2, . . . , Tm, . . . , each consisting of a predetermined number of tracks, the recording and reproduction of information are effected on the basis of the CAV system. Within this range, the sectors in the individual tracks have their starting and ending points basically aligned in the radial directions of the disk 10, so that ready access to a given sector in this range is feasible. That is, the difficulty of access that is attributable to the CLV control can be alleviated to that extent.

Further, with the information recording/reproducing apparatus described above, one-to-one correspondence between the track number data and the data which is concerned to the rotational speed of the disk 10, the number of sectors in each track and the position of the starting point of each sector, is obtained from the data conversion table based on equation 4, which is stored in the data converter 26. Thus, once a given track number is assigned by the track address assigning section 20, not only the position of the track having the specified track number on the disk 10 but also the number of sectors in the present specified track, the position of the starting point of these sectors and the rotational speed V of the disk 10 for properly effecting the recording and reproduction with respect to the specified track can be automatically and univocally determined solely by the data converter 26. That is, a given sector can be reliably and readily detected or retrieved at the time of the recording or playback. Further, with the disk rotation control signal and information signal system related to each other in a predetermined way, once the track number is assigned, the rotational speed of the disk 10 for properly effecting the recording or reproduction of information with respect to the track of the assigned track number is set. Thus, while the recording/reproducing head section 16 is being brought to the position corresponding to the assigned track, the rotation controller 28 brings the DC motor 12 to the aforementioned disk speed for the assigned track. It is thus possible to reduce the time required for the rotational speed control necessary for the CLV control. The access speed can thus be increased. This is particularly beneficial in cases where the head section 16 is moved at random to access a sector for recording or reproducing information unit.

Moreover, in the reproduction mode, the reproducing operation may be continued without changing the disk speed if the radial head position range corresponding to one track group is exceeded so long as the tolerance of the reading clock control system is not exceeded. For example, the disk rotation number per unit time R for an assigned track is determined by equation (3), and the number of bits stored in the new track is $N_O \times N_R \times N_i'$. If the reproducing operation is continued to reproduce the data stored in the new track without changing the previous disk rotation number R, the clock frequency $f_O'$ of the read-out data is as follows:

$$f_O' = R \cdot (N_O \times N_R N_i'). \tag{5}$$

By substituting equation (5) into equation (3) and rearranging, we obtain $$f_O' = f_0 \left(1 \pm \frac{N_i - N_i'}{N_i}\right) = f_0 \left(1 \pm \frac{\Delta N_i}{N_i}\right). \tag{6}$$

Assuming the tolerance of the reading clock control system to be about $\pm 10\%$ of $f_O$, $\Delta N_i$ is $\pm 8$ when $N_i$ is 80. That is, where the frequency-division factor $N_i$ of the variable frequency divider 52, in the rotation controller 28, is changed stepwise each time the head section 16 has been displaced a distance $\Delta L_R'$ of 1.5 mm in the radial direction of the disk 10, information, stored in tracks within $\pm 12$ mm of the radial distance from the limit of the radial head position range, can be reproduced without changing the previous rotational speed of the disk 10.

Although the present invention has been shown and described with respect to a particular embodiment, nevertheless, various changes and modifications which are obvious to a person skilled in the art to which the invention pertains are deemed to lie within the spirit and scope of the invention.

For example, the recording medium is not limited to the optical-disk, but various other recording media such as magnetic and magneto-optical media may be used to obtain the same effects so long as they are in the form of a disk. Further, while in the above embodiment data was recorded as concentric circular tracks on the disk-shaped recording medium, the same effects may be obtained using recording data on a helical track as well.

Further, the frequency-division factor $N_i$ of the variable frequency divider 52 in the rotation controller 28 may be calculated to satisfy equation (4). Further, in playback the sectors in an assigned track may be counted and the count may be given as the variable frequency-division factor. It may be added that the synchronizing mark 38 may not necessarily be located in a position aligned with the first sectors 82 and therefore be located, for example, in a position 180° away from the first sectors 82. That is, the position of the first sectors 82 has only to satisfy a positional relation initially determined by the mark 38.

What we claim is:

1. An apparatus for recording and reproducing information using a disk-shaped information storing medium such as a recording disk, said apparatus comprising:
  (a) motor means for rotating said recording disk;
  (b) head means for defining, on said rotating disk, a plurality of tracks each of which includes a plurality of information storing sectors and for reproducing the information stored in at least one of the sectors in a given one of the tracks, said head means linearly moving in the radial direction of said recording disk, and the tracks being divided into a plurality of track groups each including a given number of adjacent tracks; and
  (c) motor control means connected to said motor means, for controlling the rotation of said motor means in such a manner that the angular velocity of said recording disk is made substantially constant while said head means is tracing the tracks of a first track group; and for changing the angular velocity, when said head means is allowed to trace the tracks of at least a second track group adjacent to the first track group, to control the rotation of said motor means so as to cause an average linear velocity of said rotating disk while said head means is tracing the tracks of the second track group to be made substantially equal to that while said head means is tracing the tracks of the first track group, whereby the sectors in the tracks of the first track group has an average sector length substantially equal to the average sector length in the tracks of the second track group, said motor control means comprising,
    (i) first frequency divider means for receiving an oscillation signal having a reference frequency and for frequency-dividing the oscillation signal by a fixed frequency-division factor,
    (ii) second frequency divider means for dividing the output signal from said first frequency divider means by a variable frequency-division factor thereof, and
    (iii) motor driver means connected to said second frequency divider means and to said motor means, for receiving the output signal from said second frequency divider means and a first signal representing the state of rotation of said motor means, and for controlling the rotation of said motor means such that said second signal and the output signal from said second frequency divider means coincide with each other, said second frequency divider means changing the variable frequency-division factor Ni thereof to be substantially equal to:

$$\frac{L_R}{dp} \cdot \left(\frac{2\pi}{N_O - N_R}\right)$$

where
  $N_R$: the number of pulses of the first electrical signal for one rotation of said disk,
  $N_O$: the frequency division-factor of said first frequency divider means,
  $L_R$: the position of said head means in the radial direction of said disk, and
  dp: the wavelength of one-bit information stored in the disk.

2. An apparatus according to claim 1, wherein said second frequency divider means temporarily stops changing the variable frequency-division factor to hold at a specific value while said head means linearly moves within a predetermined range of distance corresponding to the width of each track group.

3. An apparatus according to claim 2, wherein said frequency-division factor $N_O$ of said first frequency divider means and said number $N_R$ of pulses of said first electrical signal are selected such that the number of bits contained in a pertinent one of said sectors of tracks formed on said disk is equal to the product of $N_O$ and $N_R$, so that the frequency-division factor Ni of said second frequency divider means is equal to the number of sectors in said pertinent track.

4. An apparatus according to claim 3, further comprising:

track assigning means for producing a second electrical signal representing at least one of the tracks formed on said disk; and data converter means connected to said track assigning means and to said motor control means, for receiving said second electrical signal and for converting said second electrical signal according to a predetermined data conversion system to produce a third electrical signal univocally corresponding to said second electrical signal and regulating the motor control operation of said motor control means.

5. An apparatus according to claim 4, wherein said second frequency divider means varies the frequency-division factor thereof in response to the third electrical signal from said data converter means.

6. An apparatus according to claim 5, further comprising:

second motor means connected to said head means, for moving said head means linearly in the radial direction of said disk; and access control means connected to said track assigning means and to said second motor means, for controlling said second motor means such that said head means is brought to a position corresponding to at least one track represented by the second electrical signal while said first motor means is being controlled for rotation by said motor control means.

7. An apparatus according to claim 6, wherein said recording disk, which is controlled for rotation such that it is rotated approximately by the constant linear velocity technique for said individual track groups and by the constant angular velocity technique for the individual tracks in each of said track groups, has at the edge portion thereof a mark member representing a reference position of said disk, the first sectors in said individual tracks formed on said disk having the respective starting points substantially aligned along a reference line connecting the center of said disk and said reference position.

8. An apparatus according to claim 7, further comprising:

sector assigning means for producing a fourth electrical signal representing at least one of a plurality of sectors in at least one of said tracks formed on said disk;

detector means disposed in the vicinity of said rotating disk, for detecting said mark member and generating a detection signal in response to the detection of said mark member; and sector retrieving means connected to said sector assigning means and to said detector means, for counting up sector numbers from a first sector contained in said at least one track and aligned with first sectors in the other tracks along said reference line and for retrieving said at least one sector by detecting the coincidence of the count and the sector number represented by the fourth electrical signal, the count content of said sector retrieving means being reset by said detection signal.

* * * * *